United States Patent [19]

Sharbaugh et al.

[11] 4,302,296
[45] Nov. 24, 1981

[54] APPARATUS FOR INSULATING HOT SODIUM IN POOL-TYPE NUCLEAR REACTORS

[75] Inventors: John E. Sharbaugh, Bullskin Township, Fayette County; Wesley L. Howarth, Bridgeville, both of Pa.

[73] Assignee: Electric Power Research Institute, Inc., Palo Alto, Calif.

[21] Appl. No.: 946,638

[22] Filed: Sep. 28, 1978

[51] Int. Cl.³ .............................................. G21C 9/00
[52] U.S. Cl. ...................................... 376/290; 376/404
[58] Field of Search .................... 176/38, 40, 50, 62, 176/64, 65, 87

[56] References Cited

U.S. PATENT DOCUMENTS

| | | | |
|---|---|---|---|
| 4,043,866 | 8/1977 | Durston | 176/65 X |
| 4,043,867 | 8/1977 | Benque et al. | 176/40 |
| 4,046,629 | 9/1977 | Durston et al. | 176/40 X |
| 4,055,465 | 10/1977 | Lemercier | 176/65 X |
| 4,056,438 | 11/1977 | Gama et al. | 176/65 X |
| 4,115,192 | 9/1978 | Jogand | 176/40 |
| 4,156,629 | 5/1979 | Andreani et al. | 176/40 |
| 4,167,445 | 9/1979 | Aubert et al. | 176/40 X |

*Primary Examiner*—Peter A. Nelson
*Attorney, Agent, or Firm*—Flehr, Hohbach, Test

[57] ABSTRACT

Apparatus for insulating hot sodium in a reactor vessel in a pool-type nuclear reactor. The apparatus includes a flow isolated plenum in the reactor vessel for holding a stagnant quantity of sodium. The flow isolated plenum is located between a second plenum for holding hot sodium and the structural load bearing members of the reactor. The flow isolated plenum forms a thermally insulating field barrier between the hot sodium and the structural members.

10 Claims, 2 Drawing Figures

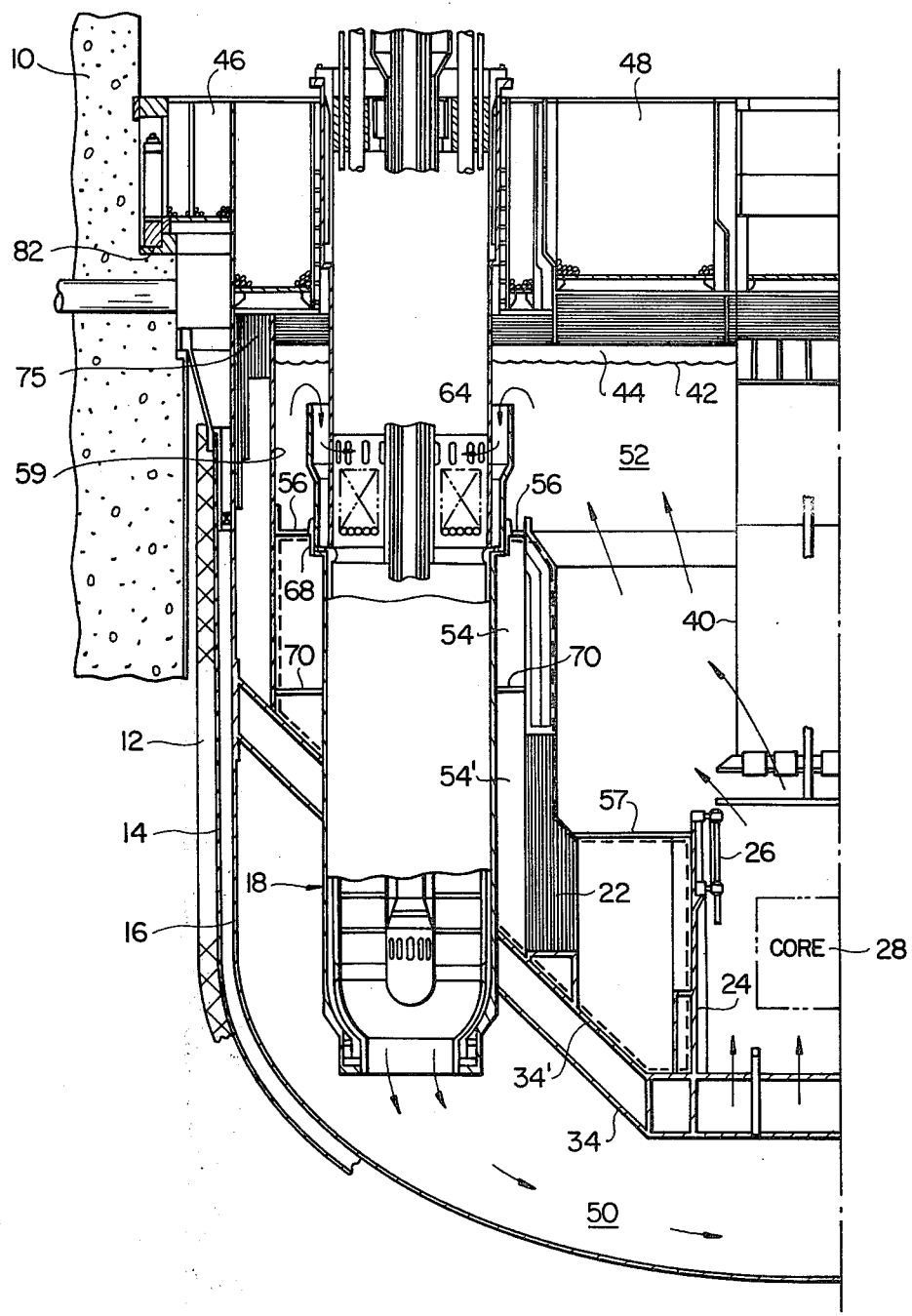
FIG__1A

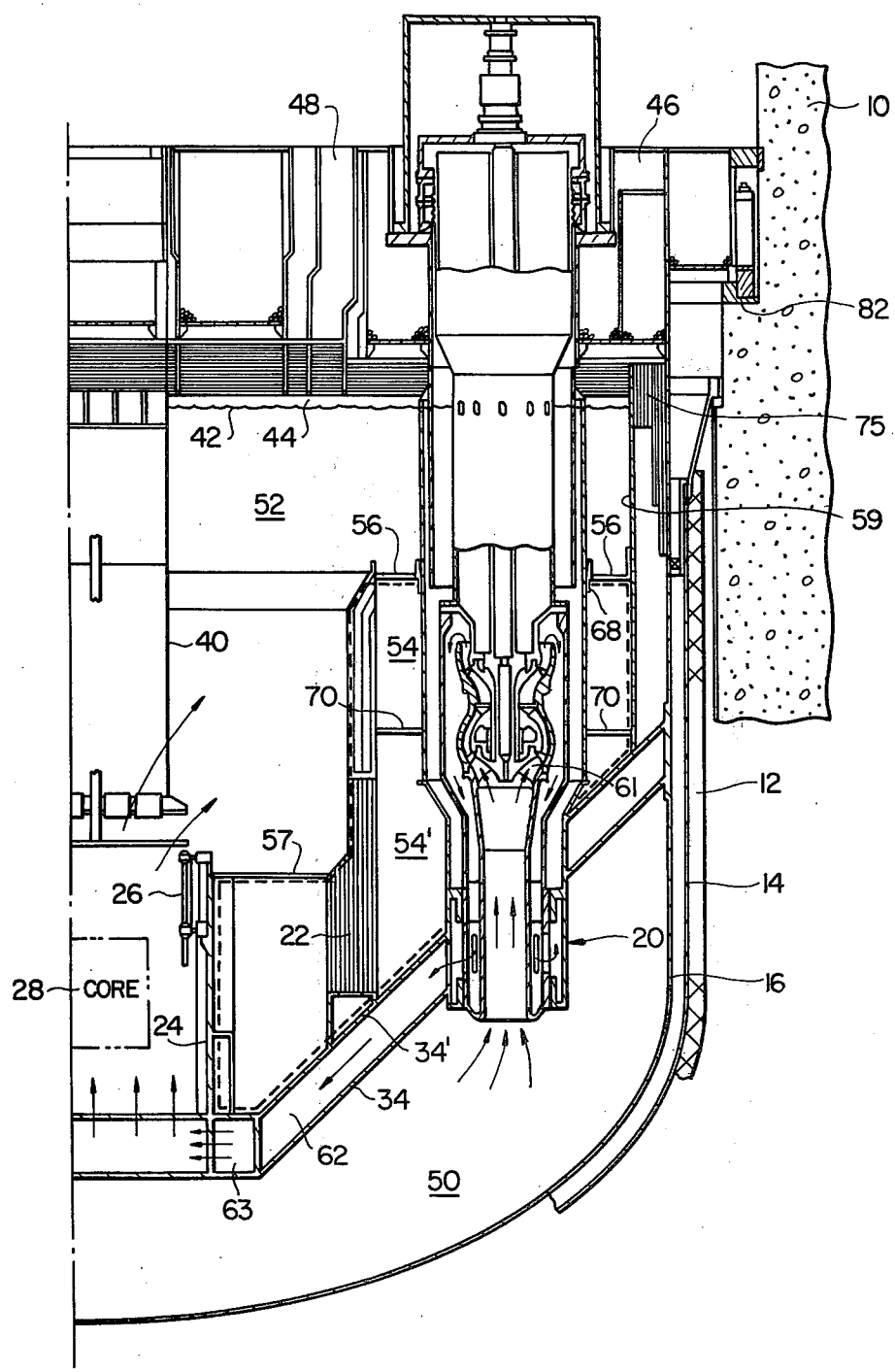
FIG_1B

APPARATUS FOR INSULATING HOT SODIUM IN POOL-TYPE NUCLEAR REACTORS

BACKGROUND OF THE INVENTION

1. Field of the Invention

This invention generally relates to sodium cooled pool-type nuclear reactors and, more particularly, to an arrangement for thermally isolating the hot sodium used in these reactors from the structural components of the reactor.

2. Description of the Prior Art

Pool-type nuclear reactors are characterized by the placement of a reactor core, a main circulating pump and a main heat exchanger within a single primary system boundary which acts as a container. Typically these reactors are designed for use with liquid metal coolant and the primary system boundary or reactor vessel holds all of the components in a pool of sodium much like a large cup.

Generally, in pool-type reactors, the coolant is pumped from a cold plenum through and into the core and is thereafter discharged into a hot plenum. From the hot plenum the coolant flows through the main heat exchangers and transfers the heat energy picked up in the reactor core to a secondary coolant. The primary coolant is thereafter discharged back into the cold plenum. The secondary coolant is pumped out of the reactor vessel and is used for power generation.

In sodium cooled pool-type nuclear reactors there is a major design problem in isolating the pool of hot sodium from the load bearing, structural members of the reactor. Sodium cooled pool-type reactors are presently designed to operate with a hot plenum pool temperature in excess of 800° F. and the design disclosed herein for a super-heated steam cycle operates with a hot pool temperature of 950° F. These temperatures are all substantially above the nominal maximum design temperature of 800° F. for stainless steel. Above this temperature stainless steel commences to creep and the reactor must be designed to thermally insulate the high temperature sodium from contacting the load bearing components of the reactor.

Over the years there have been many solutions to this problem including the use of an insulated internal tank for separating the hot coolant in the hot plenum from the reactor vessel wall. In one existing pool reactor design a plenum separator in the form of a cylindrical shell is arranged to place low temperature sodium coolant in an annular region between the hot coolant and the reactor vessel wall. A portion of the flow from the main coolant pumps is diverted into the cylindrical shell and cold sodium is pumped past the reactor vessel wall and thereby cooling it.

The present application relates to the application entitled "Plenum Separator System for Pool-Type Nuclear Reactors" by John E. Sharbaugh, Ser. No. 938,628, filed Aug. 31, 1978, and now abandoned.

OBJECTS AND SUMMARY OF THE INVENTION

It is an object of the present invention to thermally insulate the hot sodium present in a pool-type nuclear reactor from the load bearing structural components of the reactor.

It is another object of the present invention to thermally insulate the hot sodium using a passive system that requires no auxiliary cooling and does not require a flow of primary coolant.

It is a further object of the present invention to simplify the structure of the reactor, to reduce the orificing and distribution manifolds and to eliminate bypass flow around the primary heat exchangers.

The foregoing and other objects are achieved by a flow isolated plenum for holding a stagnant quantity of sodium coolant in a pool-type nuclear reactor. The flow isolated plenum is located between the plenum holding the hot sodium and the structural members of the reactor. The flow isolated plenum forms a thermally insulating fluid barrier to the heat transfered from the hot sodium.

Additional objects and features of the invention will appear from the following description in which the prefered embodiment has been set forth in detail in conjunction with the accompanying drawings.

BRIEF DESCRIPTION OF THE DRAWINGS

FIGS. 1A and 1B together are a side elevational view in cross-section of a pool-type nuclear reactor in accordance with the invention. The boundaries of the intermediate plenum are marked by phantom lines.

DESCRIPTION OF THE PREFERRED EMBODIMENT

FIGS. 1A and 1B illustrate a portion of a pool-type nuclear reactor utilizing a liquid metal coolant such as sodium. The reactor shown is substantially cylindrical with a vertical axis of symmetry. The view illustrated in FIGS. 1A and 1B represents a cross-sectional view along two radii.

The reactor includes, radially from exterior to interior, a concrete shield and support structure 10, thermal insulation 12 for the vessel, a guard tank 14, a reactor vessel 16, an intermediate heat exchanger 18, a coolant pump 20, a neutron shield 22, a core barrel 24, and a plurality of fuel assemblies 26 that make up the reactor core 28.

Within the reactor vessel 16, FIGS. 1A, 1B there are a plurality of primary main coolant pumps 20 which are the prime movers of the sodium coolant in the pool. Each pump is a bottom suction, two stage, impeller-type pump which is driven by a 7,000 horse power squirrel cage induction motor. Each pump delivers a flow of approximately 61,600 gallons per minute at a total dynamic head of 120 psi. In addition, the reactor vessel contains a plurality of intermediate heat exchangers 18 that are used to transfer heat from the primary pool to a secondary loop of sodium while isolating the primary sodium from the secondary sodium. The function of the intermediate heat exchangers is to prevent the transport of radioactive primary sodium and its associated corrosion and fission products out of the reactor vessel. In the design illustrated in FIGS. 1A and 1B four primary coolant pumps and six heat exchangers are used, although only one of each is shown.

The core 28, FIGS. 1A, 1B includes a region of both fertile and fissile fuel surrounded by an additional region of fertile fuel. The core is contained radially by the core barrel 24. Located just outside of the core barrel is a circular neutron shield 22 which limits the activation of the secondary sodium in the intermediate heat exchanger 18.

The core 28, FIGS. 1A, 1B and the neutron shield 22 are supported by a lower support structure 34. The lower support structure provides horizontal restraint and seismic support to the bottom of the coolant pumps 20 and horizontal seismic support to the bottom of the intermediate heat exchangers 18. The lower support structure includes a dual conical structure 34, 34' and eight internal ducts 62 that direct high pressure coolant from the discharge of the primary pumps into the bottom of the core barrel 63, thereby eliminating the need for piping between the primary pumps and the core.

Above the core 28 is an upper internals structure, shown merely by the envelope 40. The upper internals structure includes a plurality of components for aiding the communication between the outside of the reactor and the core 28 and means for guiding the control rods in their motion with respect to the core.

The level of the sodium coolant in the reactor during normal operation is shown by the line 42. Above that level 42 is a cover gas space 44 which contains an inert gas such as argon. Above the cover gas is a plurality of rotatable plugs 48 supported by a reactor roof structure 46 or deck.

In addition to the cover gas space, the remaining space within the reactor vessel 16 is divided into three plenums: a cold plenum 50, a hot plenum 52 and an intermediate plenum 54. The cold plenum is bounded by the bottom portion of the reactor vessel 16 and the lower support structure 34. During normal reactor operation the cold plenum is very turbulent, well mixed and has a mean temperature of 670° F. The cold plenum acts to mix the discharges from the intermediate heat exchangers 18 and serves as the supply reservoir to feed the main coolant pumps 20. The hot plenum 52 exists above the reactor core 28 and receives the sodium flowing out of the core barrel 24 and the upper internals structure 40. During normal reactor operations the sodium in the hot plenum is very turbulent, well mixed, and has a mean temperature of 950° F. The intermediate plenum 54 is bounded on the top by the inner and outer horizontal baffles 56, 57, respectively, and on the bottom by the lower support structure 34'. The intermediate plenum and the exact boundaries of these plenums are described in greater detail below.

The flow path of the sodium through the reactor during normal operations is illustrated in FIGS. 1A and 1B by the arrows. The primary pump 20 draws suction from the cold plenum 50 of sodium. The sodium flows upwardly into the pump impeller section 61 and then downwardly through a conduit 62 formed by the lower support structure 34. The lower support structure includes a plurality of conduits 62 of which only one is shown in FIG. 1B. The coolant mixes in an annular region 63 within the core support structure 34 and passes upwardly through the core 28. The coolant enters the core at a temperature in the range of 670° F. and is discharged after absorbing heat from the fuel assemblies 26 at a temperature in the range of 950° F. The flow through the core is on the order of 100,000,000 pounds of sodium per hour at an average velocity of approximately 25 feet per second.

The sodium exits the core 28 into the hot sodium pool within the hot plenum 52 with a great deal of turbulance. From the hot plenum the sodium enters the intermediate heat exchangers 18 through a plurality of inlets 64 and flows downwardly through the tubes of the heat exchanger while transferring heat to the secondary coolant. The secondary coolant flows within the downcomer 66. The primary coolant exits the heat exchangers through the bottom outlets and returns to the cold plenum 50 thus completing a circuit.

The present invention contemplates a flow isolated intermediate plenum 54 for preventing the high temperature sodium in the hot plenum 52 from contacting the structural members of the reactor including the lower support structure 34. In FIGS. 1A and 1B the boundaries of the intermediate plenum are marked by phantom lines to illustrate its location. The intermediate plenum physically and thermally separates the hot and cold plena. The sodium in the intermediate plenum is contained within two enclosed cells 54, 54' so that stratification of the sodium in each cell occurs and a natural thermal separator between the hot and cold plena is formed. The temperature of the sodium at the top of the upper cell 54 nearly equals the 950° F. hot pool temperature during normal reactor operation. The sodium temperature at the bottom of the lower cell 54' is close to the 670° F. temperature of the cold pool 50.

During normal steady-state conditions there is no forced circulation of the sodium in the intermediate plenum. The sodium is stagnant and is isolated from the flow of primary coolant described above. There are low velocity thermal currents which are present in the intermediate plenum but these currents do not disturb the thermal stratification of the coolant which occurs due to the density variation caused by the 670° F. to 950° F. thermal gradiant.

The bottom wall of the intermediate plenum is formed by the lower support structure 34 which forms a thermal boundary between the cold plenum 50 and the intermediate plena 54, 54'. The lower support structure also is a pressure boundary between the low pressure coolant at the suction side of the main coolant pump 20 and the high pressure coolant at the discharge side of the pump. The lower support structure is generally conical and is rigidly attached to the reactor vessel wall 16.

The inner radial boundary of the intermediate plenum is formed by the core barrel 24. Attached to the top of the core barrel is the inner horizontal baffle 57 which extends from the upper portion of the core barrel to the inner wall of the neutron shield 22. The inner horizontal baffle is an annular plate and its under surface forms an axial boundary for the intermediate plenum. The function of the inner horizontal baffle is to prevent the turbulent currents which exist in the hot pool from disturbing the stratified sodium below it.

Above the inner horizontal baffle 57, FIGS. 1A, 1B the intermediate plenum 54, 54' is radially bounded by the neutron shield 22. The neutron shield serves as a radial thermal barrier between the hot plenum 52 which contacts its inner vertical side wall and the intermediate plenum 54, 54' which contacts its outer vertical side wall.

The upper axial boundary of the intermediate plenum is the outer horizontal baffle 56. The outer horizontal baffle is an annular plate the inner edge of which is welded to the neutron shield tank 22 and the outer edge is attached to the vessel sodium shield 59 by a mechanical pin joint. The upper horizontal surface of this baffle forms a boundary for the hot plenum and the lower horizontal surface forms a boundary for the intermediate plenum. The intermediate heat exchangers 18 and the main coolant pumps 20 pass through baffle penetrations which are sealed by mechanical collars 68. These collars are flexible but nevertheless prevent the turbulent coolant flowing in the hot plenum from entering the intermediate plenum.

The purpose of the two horizontal baffles 56, 57 is to establish a stagnant pool of sodium in the intermediate plenum. The hot plenum 52 is a very turbulent region because the sodium flows from the core through the hot plenum and into the intermediate heat exchangers at a high flow rate and there are a substantial number of obstructions in that flow path. The horizontal baffles keep the turbulent currents of sodium in the hot plenum from disturbing the quiessent sodium in the intermediate plenum.

It should be understood that no attempt is made to seal the hot plenum 52 from the intermediate plenum 54. Fluid communication is permitted at various points between the two plena so that no pressure drop exists across either of the two horizontal baffles 56, 57. This construction permits the two plena to accomodate thermal expansion and contraction of the sodium during changes in reactor operating conditions.

The outermost radial boundary of the intermediate plenum is the vessel sodium shield 59. The sodium shield is a cylinder located approximately two feet inside of the reactor vessel 16. The purpose of the shield is to contain the sodium coolant. The shield is not typically a load bearing reactor structural member. The annular space between the sodium shield and the reactor vessel is filled with reactor cover gas. During normal operation the sodium shield located above the outer horizontal baffle 56 is at the temperature of the hot plenum 52. That part of the shield located below the baffle is at the sodium temperature of the intermediate plenum.

The intermediate plenum 54 is further divided into an upper plenum 54′ and a lower plenum 54′ by an intermediate baffle 70. The intermediate baffle is connected between the vessel sodium shield 59 and the outer surface of the neutron shield tank 22. Like the other horizontal baffles 56, 57 the intermediate baffle has no pressure drop across it and is used to establish thermal stratification of the sodium in the intermediate plenum. The purpose of the intermediate baffle is to restrict the irregular thermal currents in the lower intermediate plenum 54′ which occur due to its generally trapazoidal shape. This trapazoidal shape is formed by the conical shape of the lower support structure 34. The irregular thermal currents stem from the radial thermal gradient between the lower support structure which is cold, and the neutron shield tank which is hot.

The purpose of the intermediate plenum 54 is to separate the hot plenum 52 from the cold plenum 50 and to take the 280° F. temperature difference between the two plena across the fluid in the intermediate plenum. In prior designs this thermal gradient was taken across the steel structure of the reactor and required the use of insulation to protect the load bearing members. In the present design the thermal gradient generally occurs across a fluid which does not support shear forces. By establishing a stagnant, flow isolated plenum a volume of liquid absorbs the temperature gradient. A further purpose of the intermediate plenum is to protect the lower support structure 34 and thermally insulate it from the high temperature of the sodium in the hot plenum. The lower support structure carries the major portion of the internal components of the reactor and thus is the major load bearing member within the reactor vessel. Additionally, the intermediate plenum permits a substantial reduction in the diameter of the reactor vessel because the barrel located between the sodium shield 59 and the reactor vessel 14 which heretofore contained cold sodium is no longer required.

Thus, although the best mode contemplated for carrying out the present invention has been herein shown and described, it will be apparent that modification and variation may be made without departing from what is considered to be the subject matter of the invention.

We claim:

1. In a pool-type nuclear reactor which uses liquid sodium as a coolant, comprising a vertically extending main reactor vessel; a generally horizontally extending structural load bearing arrangement located within and extending across said vessel; a reactor core located directly on top of and being supported by said arrangement; a first plenum located within and generally horizontally across said vessel above said load bearing arrangement and core for containing a relatively turbulent supply of liquid sodium; and a second plenum located within said vessel above and directly adjacent to said load bearing arrangement around said core such that the latter and said second plenum together separate said first plenum and load bearing arrangement from one another, said second plenum containing a stagnant quantity of sodium serving as a thermally insulating fluid barrier between the first plenum and said load bearing arrangement.

2. A reactor as in claim 1 wherein said second plenum has substantially no net flow of sodium therethrough and achieves temperature stratification of the sodium therein as a result of variations in density of the sodium due to a temperature gradient.

3. A reactor as in claim 1 wherein said second plenum includes a horizontal baffle for reducing thermal currents within the second plenum due to irregular temperature gradients between the sodium in the first plenum and the structural arrangement.

4. A reactor as in claim 1 wherein said second plenum includes a horizontal baffle forming a top wall of the second plenum, said first plenum being located generally above said baffle, said sodium in the second plenum being in fluid and temperature communication across the horizontal baffle with the sodium in said first plenum.

5. A reactor as in claim 7 wherein said first plenum receives hot sodium discharging upward from the reactor core during operation.

6. A reactor as in claim 1 wherein the sodium in said first plenum has a temperature greater than about 800° F.

7. A reactor as in claim 1 wherein said second plenum includes means separating the latter into a first sub-plenum adjacent said first plenum and a second sub-plenum adjacent said load bearing arrangement, said sub-plenums being in fluid communication with one another sufficient to eliminate any pressure drop therebetween.

8. A reactor as in claim 1 wherein said first and second plenums are in sufficient fluid communication with one another to eliminate any pressure drop therebetween while maintaining the stagnant nature of the sodium within the second plenum.

9. A reactor as in claim 1 including a third plenum containing a relatively tubulent supply of liquid sodium lower in temperature than the sodium in said first plenum, said third plenum being located within said vessel adjacent said load bearing arrangement opposite said second plenum whereby said stagnant quantity of sodium in said second plenum also serves as a thermally insulating fluid barrier between the first plenum and third plenum.

10. In a pool-type nuclear reactor which uses liquid sodium as a coolant, said reactor comprising: a vertically extending main reactor vessel; a reactor core located within said vessel; a generally horizontally extending structural load bearing arrangement located within and extending across the vessel below said core for supporting the latter; an upper generally horizontally extending plenum located with said vessel above said load bearing arrangement and around a top section of said core for containing a supply of hot liquid sodium; a generally horizontally extending lower plenum located within said vessel below said structural arrangement for containing a supply of cooler liquid sodium; means including at least one heat exchanger and one circulation pump for providing a continuous stream of liquid sodium from said lower plenum through said core and thereafter to and through said heat exchanger and into said upper plenum whereby the sodium in each of the upper and lower plenums is in a state of turbulence; and an intermediate plenum located within said vessel between said upper plenum and said load bearing arrangement and around said core for containing a stagnant quantity of sodium serving as a thermally insulating fluid barrier between the upper plenum on one side thereof and the load bearing arrangement and lower plenum on the other side thereof, said upper plenum and intermediate plenum being in sufficient fluid communication with one another to eliminate any pressure drop therebetween while maintaining the stagnant nature of the sodium within the intermediate plenum, regardless of the turbulence in the upper plenum.

* * * * *